United States Patent [19]

Pogue

[11] 4,261,139

[45] Apr. 14, 1981

[54] SEED PROCESSOR

[76] Inventor: Gary E. Pogue, P.O. Box 389, Kennedy, Tex. 78119

[21] Appl. No.: 85,782

[22] Filed: Oct. 18, 1979

[51] Int. Cl.³ .......................................... F26B 19/00
[52] U.S. Cl. .................................. 47/58; 47/DIG. 9
[58] Field of Search ..................... 47/58, 1.42, DIG. 9

[56] References Cited

U.S. PATENT DOCUMENTS

| 80,593 | 8/1868 | Brown | 47/58 |
|---|---|---|---|
| 2,515,725 | 7/1950 | McLemore | 47/58 |
| 4,203,254 | 5/1980 | Downing | 47/58 |

OTHER PUBLICATIONS

Seeds, Yearbook of Agriculture, 1961, U.S.D.A., Wash., D.C., pp. 311 and 322 cited, the latter of interest.

Primary Examiner—Robert E. Bagwill
Attorney, Agent, or Firm—Gale R. Peterson

[57] ABSTRACT

Method and apparatus for flame treating seed, particularly seed having awn. The method and apparatus entails passing awned seed through successive flame treating stages with cooling periods between successive flame treatments.

11 Claims, 3 Drawing Figures

1

SEED PROCESSOR

BACKGROUND OF THE INVENTION

Although the present method and apparatus has particular application to processing bufflegrass seed, the method and apparatus may be used for processing any seed having an awn or beard; that is, any seed having fibrous hairs attached to the seed kernel.

Bufflegrass is a perennial warm-season bunch grass. Because bufflegrass can withstand wide extremes of moisture and drought, it is a popular pasture grass in south Texas. Bufflegrass, in fact, has been suggested as a solution to sparse range problems in the southern United States, Australia and South Africa.

Bufflegrass and other awned or bearded seeds, however, are exceedingly difficult to seed. The awn causes the seeds to be easily blown by the wind and also causes the seed to bunch together.

Bufflegrass and other similar seeds are also generally coated with a clay-like mixture prior to seeding. That coating serves to give the seeds added weight to prevent scattering and aids in seeding operations. Also, that coating generally includes a starter fertilizer to aid germination. The awn interferes with that coating and causes the seed to retain excess coating which forms coating globules. Those globules prevent uniform size seeds and interfere with seeding machinery. Further, that excess coating retained on the seeds as a result of the awn renders the seed to bulky for efficient seeding.

Awned or bearded seeds are difficult, if not impossible, to seed with standard seeding equipment because the awns tend to clog feeding mechanisms and cause the seeds to bunch together preventing uniform seeding. Although hand broadcast seeding has been used, such seeding is impractical for large areas. Large areas are most frequently aerially seeded, but known aerial seeding equipment cannot accomodate awned or bearded seed. Thus, to facilitate use of standard seeding equipment, including aerial seeding equipment, it became necessary to devise a method and apparatus to remove the awn or beard from the seed.

Various methods for solving the problem have been proposed. One proposed method involved freezing the seeds and passing the frozen seeds through rollers or seed cleaners in the hope that abrasion would break the frozen brittle awns from the seed kernel. Such method, however, would involve use of expensive equipment and had the potential of excessive seed hulling detrimental to germination.

Another proposed method was to bath the seeds in acids or other chemicals similar to acid delinting of cotton seeds. Nitric acid, however, dissolved the seeds completely and sulfuric acid had no effect on the awns.

Still another proposed method involved powdering the seeds with a dry glue, passing the seeds through a water mist and rolling the glue coated seeds into balls. During the gluing process, however, seeds potentially would have a tendency to stick to each other and to the equipment. It was also feared that the glue would interfer with germination.

Using sand paper or other abrasive to remove the awn has also been proposed, but poses a threat of seed damage.

Another proposed solution was to vibrate the seeds on a screen until the awn penetrated the screen where it would be removed by shearing blades. High probable maintenance costs of such a machine coupled with the improbability that light seed weight would permit such shearing dictated another solution be found.

Lastly, it has been proposed that the awn may be burned from the seed. Such burning, however, unless carefully controlled, poses a threat of seed damage and concomittant low germination.

Experimental seed flaming has been done by hand feeding awned seed through a funnel shaped hopper having a flame generating device at the throat of the funnel. Feed rate, however, had to be strictly controlled to prevent clogging and burn rate control was lacking. Such method was furthermore impractical on a commercial scale.

A proposed modification to that experimental device involved placing an auger in the center of the funnel to regulate seed flow. Vanes for breaking apart seed clusters were also installed on the funnel opening. Additional proposed modifications to that experimental device were an inverted cone and ring burner assemblage placed below the funnel throat such that seed would fall over the inverted cone and through the flame generated by the ring burner at the periphery of the inverted cone. Also, it was proposed to pass the burned seed through a water mist spray to cool the seed but the water posed a problem of premature germination.

A similar proposal involved a trough assembly with a burner placed at the bottom thereof. Such device posed problems similar to the foregoing.

Another proposed flame treating method involved placing awned seeds on a conveyor assembly and passing the seed under a flame as opposed to dropping seed through a flame. That proposal offered better burn rate control, but lacked the added heat imparted to seed falling through a burner.

Still another proposal involved a flash burning technique. That method entailed purging a chamber containing bufflegrass with a volatile gas and igniting the gas with a spark. The resultant flash burning was intended to singe the awn but not overheat the seed.

Another proposed method called for blowing a flame through a wire screen belt transporting the awned seed. It was found, however, that insufficient burning resulted.

Lastly, another proposed method involved a continuous belt conveyor with five drop stages at which seed was dropped through a flame.

SUMMARY OF THE INVENTION

The invention involves transporting seed having awn to a first treatment station where the seed is allowed to pass through a controlled flame at a rate such that the flame will singe or remove a portion of the awn but will not impart sufficient heat to the seed that the seed kernel will be damaged. After passing through that first flame treatment, the seed is cooled by passing cooling air over the seed. That cooling air serves primarily two purposes. The first is to cool the seed and allow for successive flame treatments without seed kernel damage. The second purpose served is that the air removes combustion products formed during the flame treating process. An added advantage is the cooling air removes light seed having a low incidence of germination. The resulting treated seed thus, in addition to having the awn removed, may have a higher incidence of germination than prior to treatment.

After cooling air has been passed over the seed, the seed is transported at a controlled rate to successive treatment stages where the seed is again passed through a controlled flame. The method of transport from one station to another is not critical and any suitable transport means may be used. However, the transport means chosen should provide sufficient cooling time between flame treatments to allow the seed to cool sufficiently thereby preventing damage to the seed kernel during subsequent flame treatments.

Also, it is preferable that the seed be transported on a first in, first out basis. In other words, the first seed passing through a flame treatment stage should be the first seed transported to a successive treatment stage. A transport means which does not provide for such a first in, first out basis would transport unevenly cooled seed to successive treatment stages. Thus, some of the seeds successively treated would have cooled longer than others. The result, would be low germination due to seed damage by improper cooling. Although any transport means is suitable to transport the seed between the treatment stages for removal of the awn and, indeed, the awn will be so removed, the resultant low germination due to inadequate cooling may negate the advantages obtained from awn removal.

Numerous transport means offering such first in first out capability may be used, however, the elevator system illustrated in the accompanying drawings is particularly advantageous. Moreover, the elevator system of the invention offers several unexpected advantages. The elevator system will not become clogged by awned seed and serves to break apart seed clusters. Thus, seed may be uniformily delivered to each flame treatment station thereby allowing each seed to receive the full effect of the flame treatment. Additionally, the elevator system allows for transport of the seeds in a thin layer allowing each seed to be cooled by ambient air.

The burner chosen for each flame treatment stage should provide for automatic start-up and shut-down with suitable means to control the size and temperature of the generated flame. The burner should also be of such design that all seed conveyed to the burner will pass through the burner generated flame. Another burner requirement is that the burner not be susceptible to clogging due to seed passing through the generated flame or be susceptible to clogging by combustion products generated during the flaming process. The burner must also be capable of generating a sufficiently intense flame that it will singe or remove all or a portion of the awn without causing damage to the seed kernel.

The burner assembly of the invention, as more fully described below, consists of a fuel regulating section feeding a combustible gas to a burner extending across the width of each elevator section. The burner consists of a pipe having spaced holes such that seed propelled by the force of gravity will fall past such holes. In other words, upon ignition, the burner will emit flames from such holes along the width of each elevator section in a direction perpendicular to the falling path of the seed. Thus all seed conveyed to the burner will pass through the burner generated flames. Disposing the burner such that the holes extend perpendicularly to the direction of seed travel obviates clogging which might otherwise occur if the holes extended parallel to the direction of seed travel.

Although such burner will serve to remove all or a portion of the awn without damage to the seed kernel, it has been found advantageous to dispose a flame intensifier plate opposite the burner holes on the other side of the path taken by falling seed such that the flames generated by the burner strike that plate. The flame intensifier may take any of a variety of forms, but a strip of plate steel so disposed opposite the burner holes has been found to perform the intended function. The flame intensifier serves to confine the flames generated by the burner and prevent damage to the apparatus in addition to protecting against a possible fire hazard. Surprisingly, however, the flame intensifier caused a fire ball effect in the space between the burner and intensifier. That fire ball effect removed more awn than the flames without the flame intensifier, but without expected seed damage.

The burner of the invention also includes means for automatic start-up and shut-down and means to control the size and temperature of the generated flame as more fully described below.

Accordingly, the principal object of this invention is to provide a novel system and procedure for removing awn or beard from seeds.

Another object of this invention is to provide a novel system and procedure for removing awn or beard from seeds without damaging the seed kernel in such manner that germination is impaired.

A further object of the invention is to obviate the problems experienced heretofore in attempting to remove awn or beard from seed and to provide a commercial, practicable, efficient method and apparatus for removing all or substantially all awn or beard from awned or bearded seed with little or no damage to the seed and no substantial (if any) reduction in germination.

Other objects, features, and advantages of the invention will become evident in light of the following detailed description, when considered in conjunction with the referenced drawings, of a preferred exemplary system and method according to the invention.

DETAILED DESCRIPTION OF THE INVENTION

Figure 1:
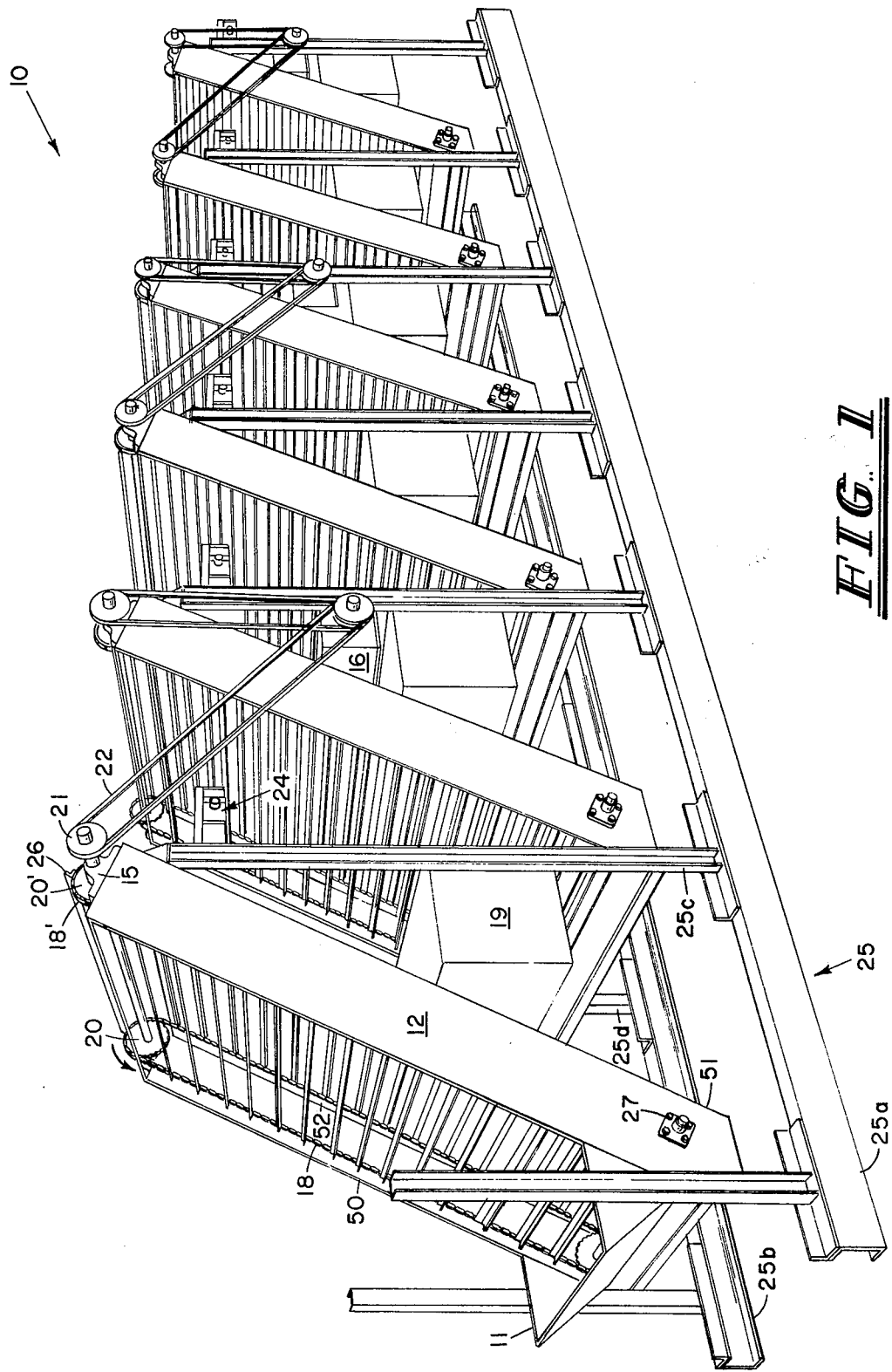
FIG. 1 is a perspective view of the apparatus of the present invention.

Referring to FIG. 1, awned or bearded seed is introduced into the apparatus 10 of the present invention through hopper 11. The seed may either be hand-fed to hopper 11 or suitable mechanical conveyor means may be used. First transport means elevator section 12 consists of an elevator assembly composed of open-link continuous chains 18 and 18' joined at spaced intervals by angle bars 26. Angle bars 26 are carried by chain 18 and rest against the bottom of elevator 12 such that seed is captured in those bars from hopper 11 and transported upwardly to the first of several burner assemblies 24. The elevator chains 18 and 18' of elevator section 12 is driven by sprocket wheels 20 and 20' with idler sprocket wheels at the base of elevator section 12 (not shown) suitably journeled at 27. Sprocket wheels 20 and 20' are mounted on shaft 14 suitably journeled at 15. Drive pulley 21 is mounted on and serves to rotatably drive shaft 14 and, thus, sprocket wheels 20 and 20'. Belt drive 22, of course, drives shaft 14 through pulley 21. As shown in FIG. 1, two or more elevator chains may be driven by a single drive motor 16.

Each elevator section consists of two side members, 50 and 51 and a bottom member 52 forming a channel as illustrated in FIG. 1. Chains 18 and 18' are of sufficient length and tension that angle bar 26 will scrape the bottom 52 of each elevator section thus carrying seed 53 to the top of the section. As most clearly shown in FIG. 2, chains 18 and 18' are adjusted to allow slack in the return portion at the top of the elevator section. Each elevator section is inclined at a suitable angle such that seed will be easily carried up each section to the treatment stations.

The speed at which seed is transported from one treatment station to another may be controlled by varying the diameters of drive pulley 21, the diameter of the pulley attached to motor 16, and the rotational speed of motor 16. Transport speed should be chosen such that seed arriving at subsequent flame treatment stages has cooled sufficiently that the seed will not be damaged by subsequent flame treatment.

Figure 2:
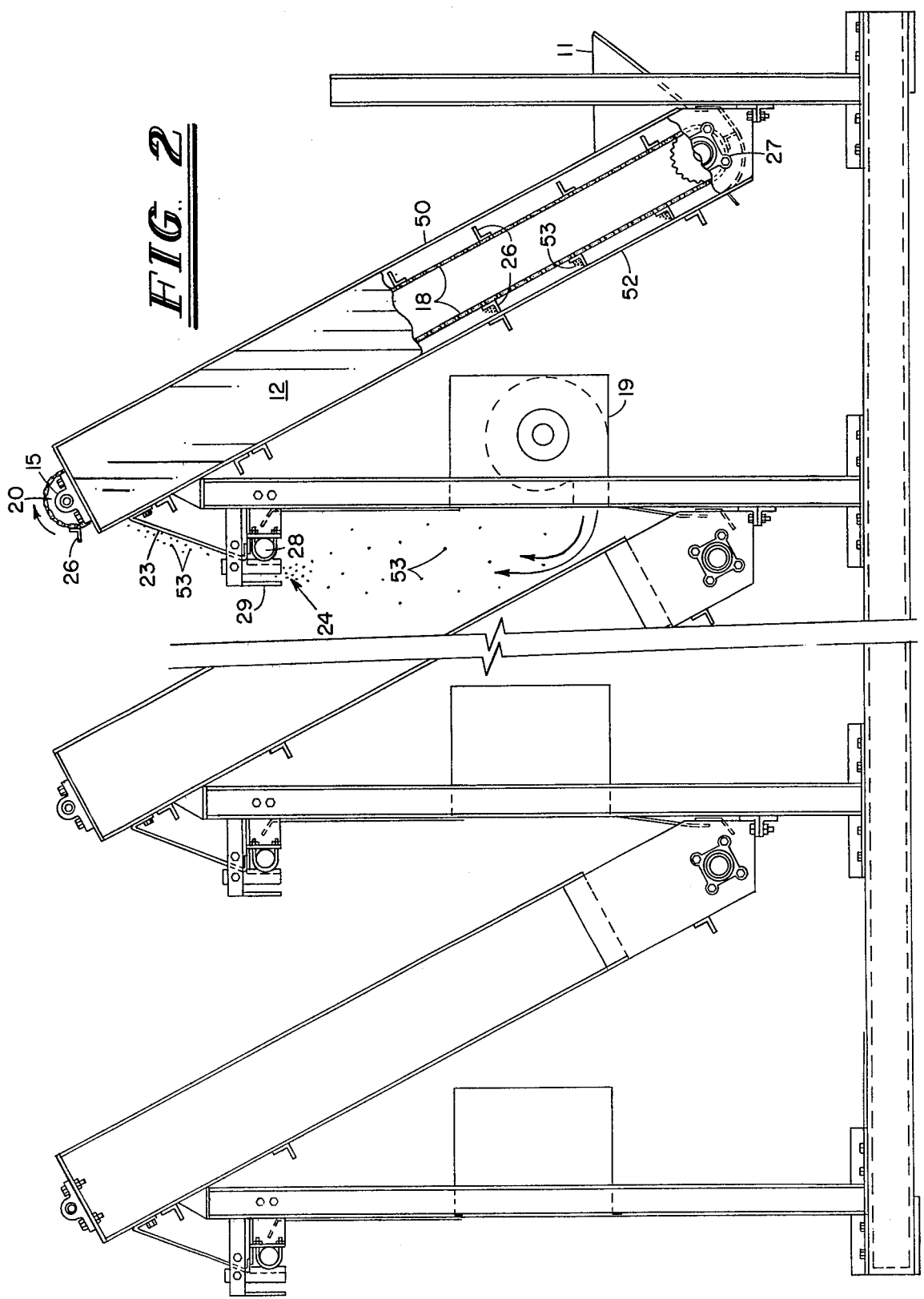
FIG. 2 is a broken side view of the apparatus of the present invention.

As most clearly seen in FIG. 2, chains 18 and 18' and angle bars 26 carry seed to the top of first elevator section 12 where the seed is allowed to fall by force of gravity over guide member 23 past burner assembly 24. As more fully described below in reference to FIG. 3, burner 24 consists of a flame generating device 28 and a flame intensifier 29. Flame generating device 28 emits a flame perpendicular to the direction of the falling seed and thus against flame intensifier 29. The coaction of flame generating device 28 and flame intensifier 29 create a fireball effect in that confined area. Seed passing through that fireball effect by the force of gravity will heat to a sufficient temperature to remove all or a portion of the awn without damage to the seed kernel. Although the flame intensifier 29 is preferred, the burner assembly alone, i.e. without a flame intensifier, serves to remove seed awn in accordance with the invention, but not as efficiently.

A blower 19, as most clearly shown in FIG. 2, of conventional design is positioned such that it will blow cooling air opposite to the direction of the falling seed. That cooling air will cool the seed and will also blow combustion products up and away from the apparatus. Because the air flow is generally in an upwardly direction, that air flow will also delay the fall of the seed thus adding time for the seed to cool. Blower 19 also has the ability to blow away light seed having a low incidence of germination.

After passing through burner assembly 24, the seed will fall into a second elevator section substantially identical to first elevator section 12. Thereafter the seed is elevated to a second treatment station where it is again allowed to fall through a burner assembly substantially similar to assembly 24 and be cooled by successive blowers substantially similar to blower 19.

As aforesaid, each elevator section not only serves to transport the seed from one treatment station to another, but allows time for the seed to cool between successive flame treatments. Additionally, the rubbing action of angle bars 26 against bottom member 52 serves to remove charred awns. The particular transport means chosen, in this case an elevator means, should also serve to transport the first seeds passing through a treatment station first to a second treatment station and so forth. In that manner even heating and cooling of the seed may be accomplished.

As illustrated, six stages of treatment have been found sufficient to remove substantially all awn. More or less stages, of course, may be used depending on the amount of awn desired to be removed. Indeed, if the heat generated by burner assembly 24 were suitably controlled and if the seed were transported in such manner that the seed would not bunch together and seed kernels were evenly exposed to the flame treatment, a single stage may be used to remove substantially all of the awn without seed damage.

Figure 3:
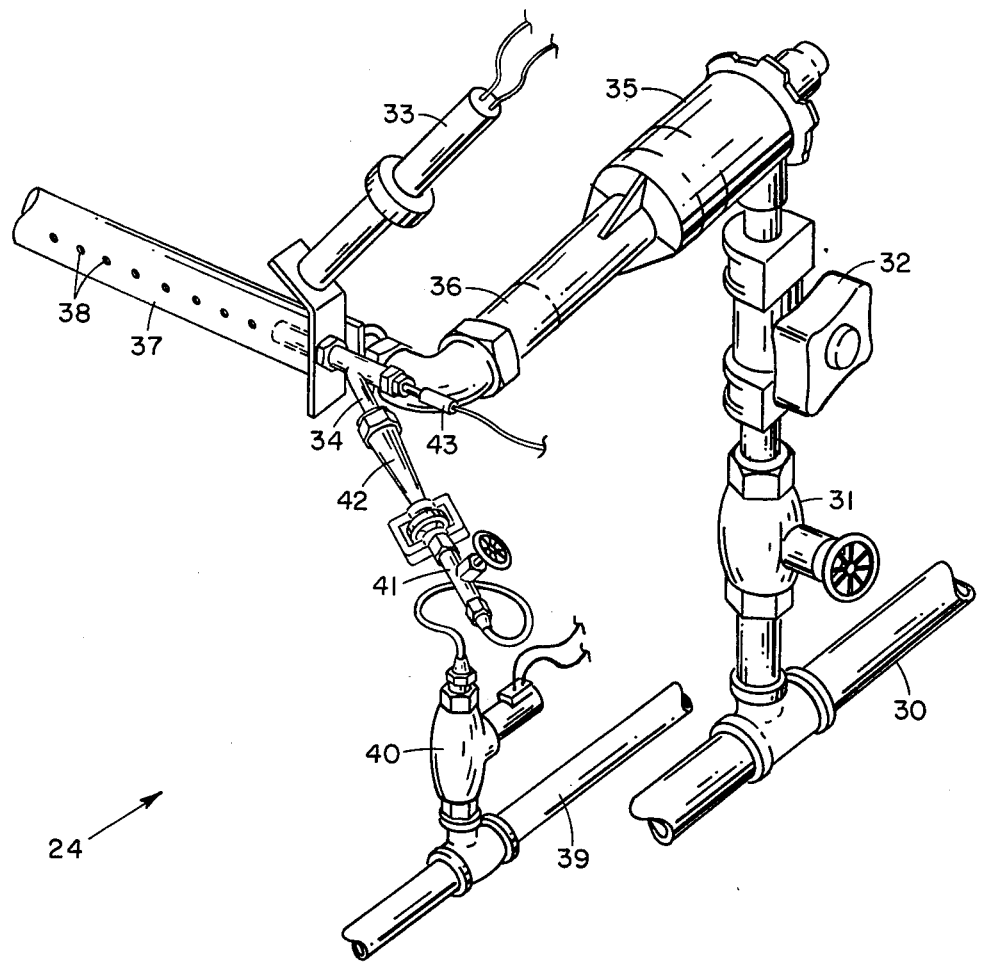
FIG. 3 is a perspective view of the burner of the present invention.

Referring to FIG. 3, fuel to power burner assembly 24 is supplied through pipe 30 to throttle valve 31 used to adjust the flame size. A burner solenoid valve assembly 32 operably connected to an ultra-violet scanner 33 of conventional design operates to open the main fuel supply to the burner only when the flame of pilot light assembly 34 is on. In the event the flame of pilot light assembly 34 goes out, the ultra-violet scanner 33 senses the absence of that flame and causes solenoid valve 32 to close thus shutting off the burner fuel supply.

After passing through solenoid valve 32, burner fuel is mixed with air in mixer assembly 35. The air and fuel mixture is then transported to burner 37 through mixer outlet 36. Burner 37 may be of any suitable design allowing for a broad flame, however, a standard two-inch pipe drilled with No. 31 holes approximately a quarter of an inch apart has been found preferable. The opposite end of burner 37, of course, is capped thus forcing the air and fuel mixture upon opening solenoid valve 31 through holes 38.

Pipe 39 supplies fuel through solenoid valve 40, throttle valve 41 and fuel air mixer 42 to pilot light assembly 34. Solenoid valve 40 is likewise connected to ultra-violet scanner 33 such that solenoid valve 40 will close upon ultra-violet scanner 33 sensing the absence of a pilot flame. Suitable means 43 are provided for electric ignition of the pilot light. Any suitable means, for example an igniter, may be used. During the ignition of the pilot flame, a manually operated electric override of the ultraviolet scanner is preferably provided to open solenoid valve 40.

Although the apparatus may be mounted in situ, it is desirable to mount the assembly on a frame 25 consisting of spaced parallel skids 25a and 25b and a plurality of opposed upright members 25c and 25d thus allowing for easy transport.

Therefore, awned seed from hopper 11 will be transported by elevator section 12 to a first treatment station where the seed will fall through a flame generated by burner assembly 24. Blower assembly 19 operates to pass cooling air over the seed as the seed falls and also to blow combustion products up and away from the apparatus. The cooling air from blower 19 travelling in a direction generally opposite to the path of the falling seed also serves to slow the seed fall rate and increases cooling time.

After passing through the first treatment stage, the seed is transported by a second elevator section at a rate controlled by the speed of the elevator chain in that section to a second treatment stage. There the seed is again allowed to fall through a burner assembly substantially identical to assembly 24. The transport rate as aforesaid is chosen to allow the seed to cool and prevent excessive heat buildup. At each flame treatment stage, therefore, the heat imparted to the seed will not add to heat imparted at previous treatment stages so as to damage the seed kernel.

The steps of transporting, flame treating and cooling may be continual until the desired amount of awn has been removed.

I claim:

1. A method for removing awn from bufflegrass or other light density seed comprising:
   transporting said seed to a first treatment station;
   removing a portion of said awn without damage to the seed kernel by passing said seed through a flame at said first treatment station such that a portion of said awn is removed by said flame without damage to the seed kernel;
   cooling said seed;
   transporting said seed to a second treatment station;
   removing a further portion of said awn without damage to the seed kernel by passing said seed through a flame at said second treatment station such that a portion of said awn is removed by said flame without damage to the seed kernel;
   continuing the steps of successively cooling, transporting and passing the seed through a controlled flame at subsequent treatment stations until substantially all of the awn has been removed without substantial damage to the seed kernel.

2. The method of removing awn from bufflegrass or other light density seed as in claim 1 further comprising:
   providing additional cooling for said seed immediately after said seed passes through said flame by passing cooling air around said seed in a direction opposite to the direction said seed is travelling.

3. The method of removing awn from bufflegrass or other light density seed as in claim 1 further comprising:
   transporting said seed at a controlled rate between flame treatment stations such that said seed is cooled sufficiently to allow the seed to be passed through a flame treatment station without damage to the seed kernel.

4. The method of removing awn from bufflegrass or other light density seed as in claim 1 further comprising:
   generating a flame at each treatment station in such manner that the flame is directed perpendicularly to the direction of seed travel.

5. The method of removing awn from bufflegrass or other light density seed as in claim 4 further comprising:
   positioning a flame intensifier opposite the flame at each treatment station whereby a fireball is created by the flame striking the flame intensifier.

6. An apparatus for removing awn from seed comprising:
   means for transporting said seed to a first treatment station;
   elongated flame generating means extending substantially across the width of said transporting means such that substantially all seed delivered to said treatment station will pass in close proximity to said flame generating means;
   means at said first treatment station for passing said seed through said flame generating means such that a portion of said awn is removed by said flame without damage to the seed kernel;
   means for cooling said seed after said seed has passed through a first treatment station;
   means for transporting said seed to a second treatment station;
   means for successively passing said seed through flame treatment stations; and
   means for cooling said seed after said seed has passed through said flame treatment stations whereby portions of said awn are removed in each treatment station without damage to the seed kernel.

7. An apparatus as in claim 6 wherein said means for transporting comprises:
   continuous chain link means having means attached at spaced intervals thereto for conveying seed to successive treatment stations.

8. An apparatus as in claim 6 wherein said means for cooling comprises:
   means for blowing air into the path of the seed in a direction generally opposition to the direction of seed travel.

9. An apparatus as in claim 6 wherein said means for transporting further comprises:
   means to allow the seed to cool sufficiently between successive treatment stages such that successive flame treatments will remove awn without damage to the seed kernel.

10. An apparatus as in claim 6 further comprising:
    disposing said flame generating means such that flames generated thereby intersect the direction of seed travel generally perpendicularly.

11. An apparatus as in claim 10 further comprising:
    means disposed opposite said flame generating means for creating a fire ball.

* * * * *